(12) United States Patent
Cho et al.

(10) Patent No.: US 9,041,315 B2
(45) Date of Patent: May 26, 2015

(54) LIGHTING APPARATUS

(75) Inventors: Ho Chan Cho, Suwon-si (KR); Sang Kyeong Yun, Suwon-si (KR); Heui Sam Kwag, Suwon-si (KR); Jung Hwan Park, Busan (KR); Chang Seob Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 302 days.

(21) Appl. No.: 13/176,453

(22) Filed: Jul. 5, 2011

(65) Prior Publication Data

US 2012/0007525 A1 Jan. 12, 2012

(30) Foreign Application Priority Data

Jul. 6, 2010 (KR) ........................ 10-2010-0064991

(51) Int. Cl.
*H05B 37/00* (2006.01)
*H05B 37/02* (2006.01)

(52) U.S. Cl.
CPC .......... *H05B 37/029* (2013.01); *H05B 37/0272* (2013.01)

(58) Field of Classification Search
USPC ................ 315/292–295, 297, 307–308, 312, 315/317–319, 324–325
See application file for complete search history.

(56) References Cited

U.S. PATENT DOCUMENTS

| 8,035,320 | B2 * | 10/2011 | Sibert | 315/312 |
| 2005/0248299 | A1 * | 11/2005 | Chemel et al. | 315/312 |
| 2009/0018673 | A1 | 1/2009 | Dushane et al. | |
| 2009/0284184 | A1 * | 11/2009 | Valois et al. | 315/312 |
| 2011/0295389 | A1 * | 12/2011 | McCormack | 700/19 |

FOREIGN PATENT DOCUMENTS

| JP | 2001-217083 A | 8/2001 |
| JP | 2006-092917 A | 4/2006 |
| JP | 2009-021141 A | 1/2009 |
| KR | 10-0636855 B1 | 10/2006 |
| KR | 1020080072229 A | 8/2008 |
| KR | 10-2009-0019827 A | 2/2009 |
| KR | 10-2009-0019872 A | 2/2009 |
| KR | 10-2009-0021093 A | 2/2009 |
| KR | 10-2009-0035809 A | 4/2009 |
| KR | 100899018 B1 | 5/2009 |

OTHER PUBLICATIONS

Office Action issued Jun. 2, 2011 from the Korean Intellectual Property Office in counterpart Korean application No. 1020100064991.

* cited by examiner

*Primary Examiner* — Douglas W Owens
*Assistant Examiner* — Henry Luong
(74) *Attorney, Agent, or Firm* — Sughrue Mion, PLLC

(57) ABSTRACT

Provided is a lighting apparatus that may form and control a multi-zone of a plurality of lighting devices connected to a wireless network. The lighting apparatus may include a plurality of devices including a plurality of lighting devices included in a network set in advance, a coordinator to manage the network, a remote controller to control a multi-zone that is included in the network and that performs grouping of the plurality of lighting devices into a plurality of groups.

7 Claims, 13 Drawing Sheets

| STX | DataLen | Data | Check Sum | ETX |

| BYTE | PRIMITIVE ID | DEVICE ADDRESS | COMMAND | COMMAND DATA |
|---|---|---|---|---|
| | 1 | 2 | 1 | VARIABLE |
| VALUE | 0x07 | 0x0000~0xFFFF | SELECT COMMAND IN COMMAND TABLE SET IN ADVANCE | SELECT DATA IN COMMAND DATA TABLE SET IN ADVANCE |

FIG. 4

| COMMAND | HEX | DESCRIPTION |
|---|---|---|
| LIGHT DEVICE SETTING | 0x00 | SET PARAMETER FOR FORMING AND CONTROLLING ZONE OF EACH LIGHTING |
| SWITCH SETTING | 0x01 | SET FUNCTION OF SWITCH, SCENE, FADE TIME, AND THE LIKE |
| ILLUMINATION SENSOR SETTING | 0x02 | SET CALIBRATION PARAMETER OF ILLUMINANCE SENSOR |
| MOTION SENSOR SETTING | 0x03 | SET MOTION AND MOTION PERIOD OF MOTION SENSOR |
| REMOTE CONTROLLER SETTING | 0x04 | SET FADE TIME, DISPLAY SCHEME, AND THE LIKE OF REMOTE CONTROLLER |

FIG. 5

| COMMAND | HEX | DESCRIPTION |
|---|---|---|
| GET LIGHT DEVICE | 0x10 | TRANSMIT SET PARAMETER, STATE INFORMATION, AND FAULT INFORMATION ASSOCIATED WITH LIGHTING |
| GET SWITCH | 0x11 | TRANSMIT SET PARAMETER, STATE INFORMATION, AND FAULT INFORMATION ASSOCIATED WITH SWITCH |
| GET FROM ILLUMINATION SENSOR | 0x12 | TRANSMIT SET PARAMETER, STATE INFORMATION, AND FAULT INFORMATION ASSOCIATED WITH ILLUMINANCE SENSOR |
| GET FROM MOTION SENSOR | 0x13 | TRANSMIT SET PARAMETER, STATE INFORMATION, AND FAULT INFORMATION ASSOCIATED WITH MOTION SENSOR |
| GET REMOTE CONTROLLER | 0x14 | TRANSMIT SET PARAMETER, STATE INFORMATION, AND FAULT INFORMATION ASSOCIATED WITH CONTROLLER |
| GET DEVICE DATA BASE | 0x15 | STORE INFORMATION IN DB WHILE NETWORK IS FORMED BETWEEN EACH DEVICE AND COORDINATOR, AND TRANSMIT DB IN RESPONSE TO REQUEST FROM ANOTHER DEVICE |

FIG. 6

| COMMAND | HEX | DESCRIPTION |
|---|---|---|
| ZONE CONTROL | 0x20 | CONTROL LIGHTING FOR EACH ZONE AND FOR EACH CHANNEL |
| DEVICE CONTROL | 0x21 | CONTROL LIGHTING FOR EACH LIGHTING DEVICE AND FOR EACH CHANNEL |
| RESET | 0x23 | CONTROL RESETTING OF LIGHTING |
| SCENE CONTROL | 0x24 | CONTROL SCENE OF LIGHTING |

FIG. 7

| NAME | VALID RANGE | DESCRIPTION |
|---|---|---|
| DEVICETYPE | 0x00~0xFF | REFER TO TABLE |
| NUMBEROFZONES | 0x00~0xFF | NUMBER OF ZONES TO BE SET FOR LIGHTING DEVICE (MAX: 8) |
| ZONENAME[0] | 0x00~0xFF | ZONE NUMBER TO BE SET |
| ... | ... | ... |
| ZONENAME[n] | 0x00~0xFF | ZONE NUMBER TO BE SET |

FIG. 8

| NAME | VALID RANGE | DESCRIPTION |
|---|---|---|
| NUMOFBUTTON | 0x00~0xFF | REFER TO TABLE |
| ZONENAME[0] | 0x00~0xFF | ZONE NUMBER TO BE SET FOR BUTTON #1 |
| ... | ... | ... |
| ZONENAME[4] | 0x00~0xFF | ZONE NUMBER TO BE SET |

FIG. 9

| START FRAME 1 | START FRAME 2 | SIZE OF DATA | DATA | | | | | | | CHECK SUM | END FRAME |
|---|---|---|---|---|---|---|---|---|---|---|---|
| | | | PRI. ID | DEVICE ADDRESS | CMD | COMMAND DATA | | | | | |
| | | | | | | NUM OF ZONE | ZONE NO | ZONE START. #1 | ZONE START. #2 | ZONE START. #3 | |
| | | | | | | | | | | | |

LIGHTING APPARATUS

CROSS-REFERENCE TO RELATED APPLICATION

This application claims the priority benefit of Korean Patent Application No. 10-2010-0064991, filed on Jul. 6, 2010, in the Korean Intellectual Property Office, the disclosure of which is incorporated herein by reference.

BACKGROUND

1. Field

Example embodiments relate to a lighting apparatus, and more particularly, to a lighting apparatus that may form and control a multi-zone of a plurality of lighting devices connected to a wireless network.

2. Description of the Related Art

Generally, places such as, a building, a room, a classroom, and the like, are equipped with a lighting system for a user's convenience.

For example, the lighting system, a plurality of lighting devices, may be installed in a predetermined area, or a plurality of areas which may include a plurality of lighting devices may be formed. Generally, a switch that controls supplying and blocking of power to the lighting system in the places may be wiredly installed. Accordingly, the same number of switches as the number of lighting devices may be installed. Even though a switch that controls the plurality of lighting devices based on a group unit is installed, there may be a difficulty in newly grouping the plurality of lighting devices.

SUMMARY

An aspect of example embodiments may provide a lighting apparatus that may form and control a multi-zone of a plurality of lighting devices connected to a wireless network.

The foregoing and/or other aspects are achieved by providing a lighting apparatus, including a plurality of devices which include a plurality of lighting devices included in a network set in advance, a coordinator to manage the network, and a remote controller to control a multi-zone that is included in the network and that performs grouping of the plurality of lighting devices into a plurality of groups.

The remote controller may generate a control frame to be transmitted to a selected lighting device, and the control frame may include a start of text (STX) field indicating a state of the control frame, a datalen field indicating a length of information to be transmitted, a data field including information to be transmitted, a checksum field to be used for determining an error, and an end of text (ETX) field indicating an end of the control frame.

The data field may include a primitive identification (ID) where an objective of transmission of information is written, a device address indicating an address of a lighting device that is a target for the transmission, a command including a command to be transmitted to the lighting device, and command data including data to be used for the command.

The command may include a setting command, a transmission command, and a control command.

The plurality of devices may include an illuminance sensor and a motion sensor, and the setting command may command setting of at least one of a parameter for forming and controlling a zone of the plurality of lighting devices, a function of a switch, a parameter for correcting the illuminance sensor, a motion of the motion sensor, a control element of the remote controller.

The transmission command may command transmitting of the parameter for forming and controlling the a zone of the plurality of lighting devices and information associated with a state of the lighting devices and whether the lighting devices is broken, a parameter set for the switch and information associated with a state of the switch and whether the switch is broken, the parameter set for correcting the illuminance sensor and information associated with a state of the luminance sensor and whether the luminance sensor is broken, a parameter set for the motion of the motion sensor and information associated with a state of the motion sensor and whether the motion sensor is broken, and a parameter set for the control element of the remote controller and information associated with a state of the controller and whether the controller is broken, or may command transmitting of a database of each device included in the network via the coordinator.

The lighting apparatus may further include a scene controller to control a scene of the plurality of lighting devices, and the control command may command controlling at least one of the plurality of lighting devices for each zone and for each channel, the plurality of lighting devices for each lighting device and for each channel, resetting of the plurality of lighting devices, and a scene of the plurality of lighting devices.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 2 illustrates a configuration of a frame of a lighting apparatus according to example embodiments;

FIG. 3 illustrates a configuration of a data field included in the frame of FIG. 2 according to example embodiments;

FIGS. 4 through 6 illustrate examples of a command included in a data field of FIG. 3 according to example embodiments;

FIGS. 7 and 8 illustrate examples of setting of a zone and a switch based on commands of FIG. 4;

FIG. 9 illustrates an example of a data command to control a multi-zone of a lighting apparatus according to example embodiments;

DETAILED DESCRIPTION

Figure 1:
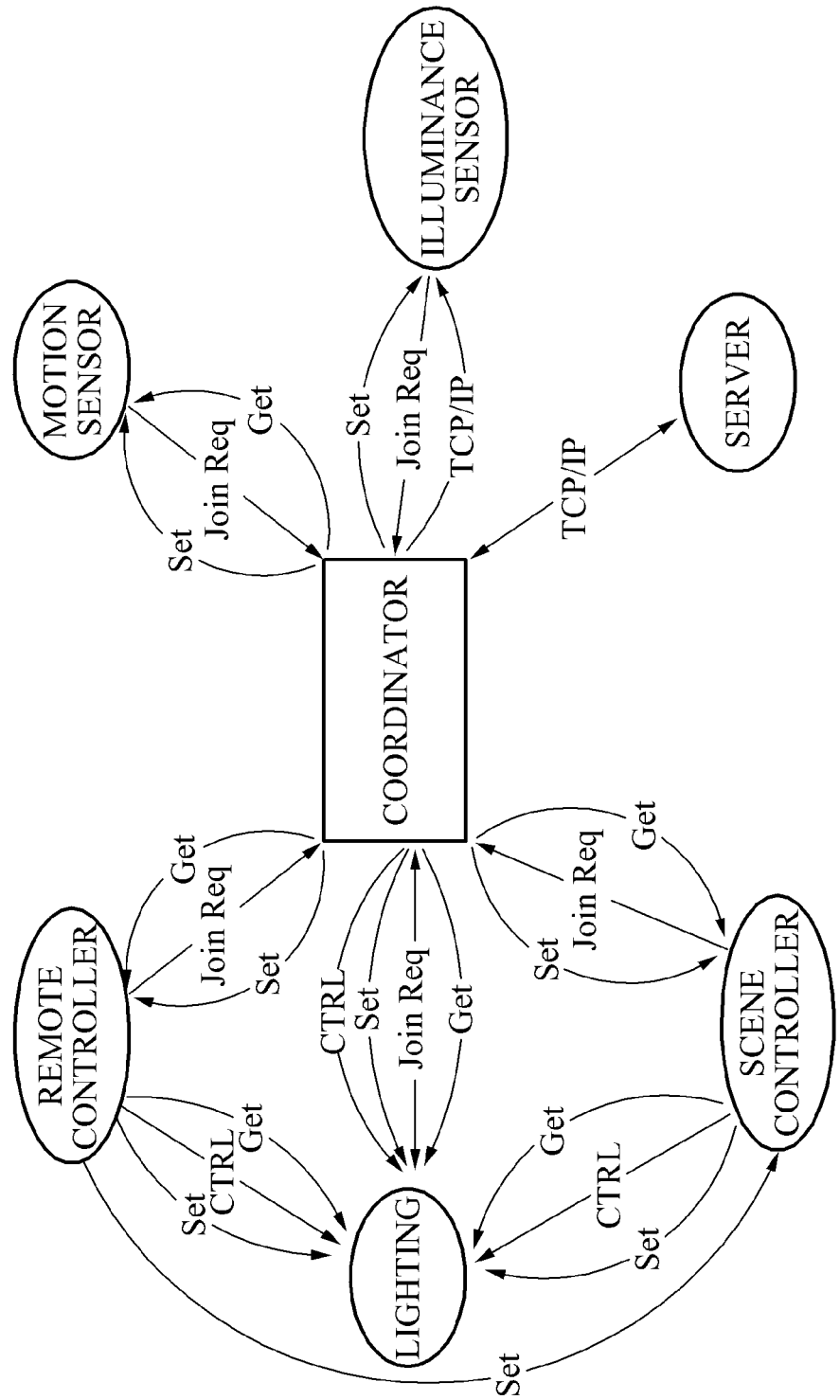
FIG. 1 illustrates a configuration of a lighting apparatus according to example embodiments.

Reference will now be made in detail to embodiments, examples of which are illustrated in the accompanying drawings, wherein reference numerals refer to the like elements throughout. Embodiments are described below to explain the present disclosure by referring to the figures.

FIG. 1 illustrates a configuration of a lighting apparatus according to example embodiments.

Referring to FIG. 1, the lighting apparatus may include a coordinator included in a wireless network, a plurality of devices, and a remote controller.

The coordinator may manage the wireless network, and in addition, may communicate with an external server based on a TCP/IP scheme.

The plurality of devices may be connected to the wireless network via the coordinator. Accordingly, the plurality of devices may perform 'Join Req' to request a connection to the coordinator. The coordinator may perform 'Set' to set the plurality of devices connected to the wireless network, may perform 'CTRL' to control the plurality of devices connected to the wireless network, and may perform 'Get' to command transmission of desired data. The plurality of devices may include a plurality of lighting devices, a motion sensor that senses motions of the plurality of lighting devices, and an illuminance sensor that senses light of the plurality of lighting devices.

The remote controller may perform 'Join Req' to request a connection to the coordinator. The coordinator may perform 'Set' to set the plurality of devices connected to the wireless network, may perform 'CTRL' to control the plurality of devices connected to the wireless network, and may perform 'Get' to command transmission of desired data. The remote controller may command 'Set', 'CTRL' and 'Get' with respect to a lighting device among the plurality of devices.

The wireless network may further include a thin controller. The thin controller may perform 'Join Req' to request a connection to the coordinator. The coordinator may perform 'Set' to set the plurality of devices connected to the wireless network, may perform 'CTRL' to control the plurality of devices connected to the wireless network, and may perform 'Get' to command transmission of desired data. The remote controller may command 'Set', 'CTRL' and 'Get' with respect to a lighting device from among the plurality of devices. The remote controller may command 'Set' with respect to the thin controller.

Figure 2:
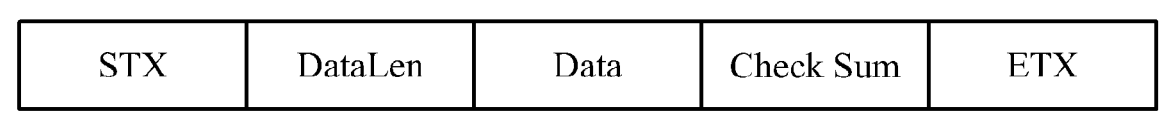

FIG. 2 illustrates a configuration of a frame of a lighting apparatus according to example embodiments.

Figure 10:
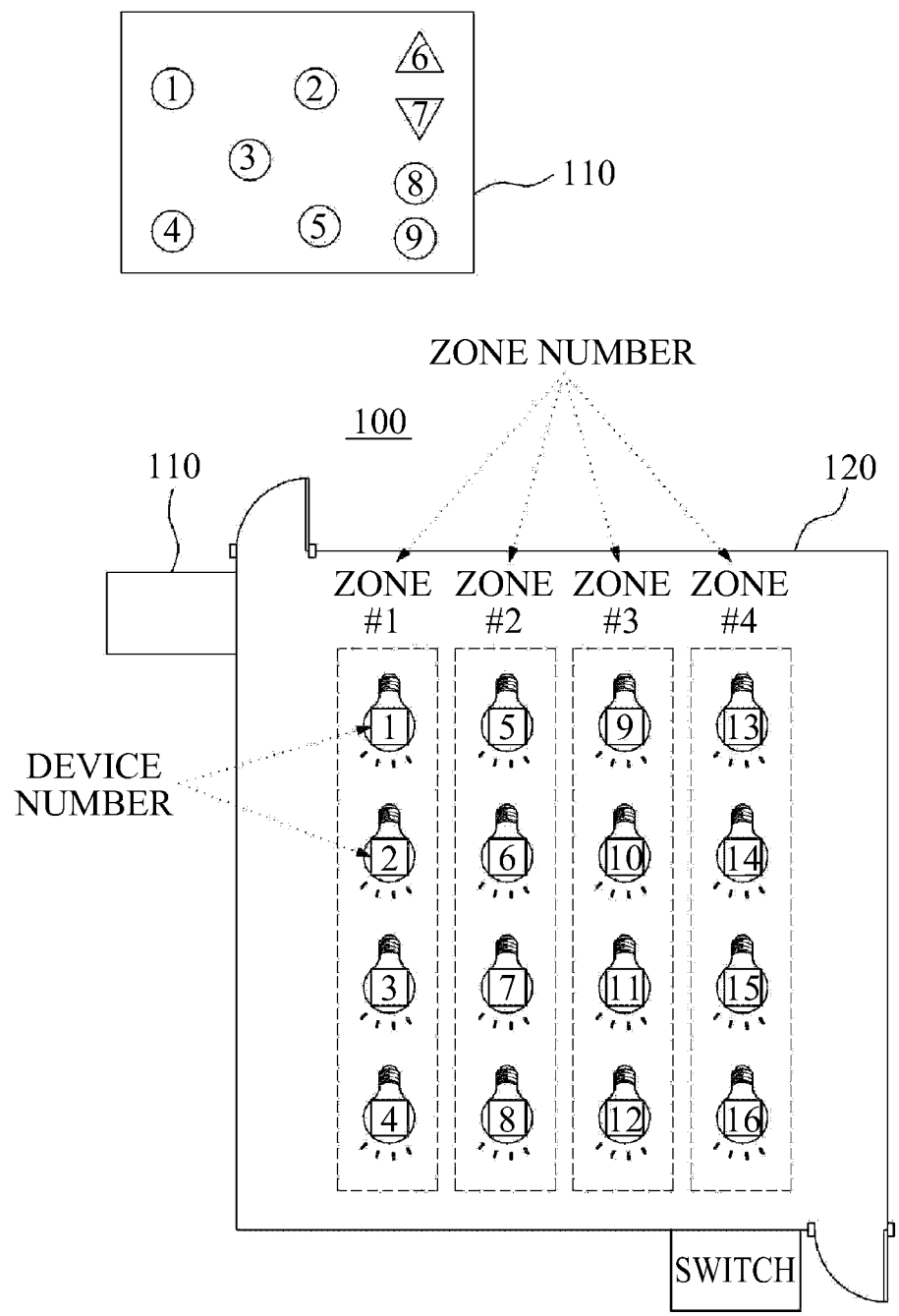
FIG. 10 illustrates an example of forming a multi-zone using a lighting apparatus according to example embodiments.

Referring to FIG. 2 and FIG. 10, a frame generating unit 120 may generate a control frame to be transmitted to a corresponding lighting device, and the control frame may include a start of text (STX) to indicate a start of the control frame, a datalen field to indicate a length of information to be transmitted, a data field including information to be transmitted, a checksum field to determine an error, and an end of text (ETX) field to indicate an end of the control frame.

FIG. 3 illustrates a configuration of the data field included in the frame of FIG. 2 according to example embodiments.

Referring to FIGS. 2 and 3, the data field included in the control frame may include a primitive identification (ID) where an objective of transmission of information is written, a device address indicating an address of a lighting device that is a target for the transmission, a command including a command to be transmitted to the lighting device, and command data including data to be used for the command.

The command may include a setting command, a transmission command, and a control command.

FIGS. 4 through 6 illustrate examples of the command included in the data field of FIG. 3 according to example embodiments.

Referring to FIG. 4, the command may be a setting command, and the setting command may command at least one of 'Light Device Setting' to set a parameter for forming and controlling a zone of a plurality of lighting devices, 'Switching Setting' to set a function of a switch, 'Illumination Sensor Setting' to set a parameter for correcting a illuminance sensor for a device group including the plurality of lighting devices, 'Motion Sensor Setting' to set a motion of a motion sensor for the device group, and "Remote Controller Setting" to set a control element of a controller. In this example, the HEX code may be set to 0x00, 0x01, 0x02, 0x03, and 0x04, respectively.

Referring to FIG. 5, the command may be a transmission command, and the transmission command may command 'Get Light Device' to transmit a parameter set for forming and controlling a zone of the plurality of lighting devices and information associated with a state of the lighting devices and whether the lighting devices are broken, 'Get Switch' to transmit a parameter set for the switch and information associated with a state of the switch and whether the switch is broken, 'Get from Illumination Sensor' to transmit a parameter set for correcting the illuminance sensor and information associated with a state of the illuminance sensor and whether the illuminance sensor is broken, 'Get from Motion Sensor' to transmit a parameter set for the motion of the motion sensor and information associated with a state of the motion sensor and whether motion sensor is broken, 'Get Remote Controller' to transmit a parameter set for the control element of the controller and information associated with a state of the controller and whether the controller is broken, and 'Get Device Data Base' to transmit a database of a device.

In this example, the HEX code may be set to 0x10, 0x11, 0x12, 0x13, 0x14, and 0x15, respectively.

Referring to FIG. 6, the command may be a control command, and the control command may command one of 'Zone Control' to control the plurality of lighting devices for each zone and for each channel, 'Device Control' to control the plurality of lighting devices for each lighting device and for each channel, 'Reset' to control resetting of the plurality of lighting devices, and 'Scene Control' to control a scene of the plurality of lighting devices.

In this example, the HEX code may be set to 0x20, 0x21, 00x23, and 0x24, respectively.

FIGS. 7 and 8 illustrate examples of setting of a zone and a switch based on commands of FIG. 4.

FIG. 7 further illustrates a data format associated with a setting command for setting a zone of a lighting device and FIG. 8 illustrates a data format associated with a setting command for setting a switch.

Referring to FIGS. 7 and 8, a value may be set based on a type of device, and the value set based on the type of device may be arranged in Table 1.

TABLE 1

| Type of Device | Range of set value | Descriptions |
| --- | --- | --- |
| Gateway | 0x00~0x09 | 0x00: Default (coordinator)<br>Others: router |
| Lighting Device | 0x0A~0x13 | 0x0A: Incandescent, Halogen, Control by phase<br>0x0B: FPD, 2 Channel Dimmable<br>0x0C: FPD, 1 Channel Dimmable<br>0x0D: Fluorescent lamp control by phase<br>0x0E: D/L, 2 Channel Dimmable<br>0x0F: D/L, 1 Channel Dimmable<br>0x10: LED MR16<br>0x11: Tube Light, 3channel<br>Others: TBD |
| Switch | 0x14~0x1D | 0x14: only Button Type<br>0x15: Button + Dimming Switch<br>Others: TBD |
| Sensor | 0x1E~0x27 | 0x1E: Illuminance Sensor<br>Others: TBD |

TABLE 1-continued

| Type of Device | Range of set value | Descriptions |
|---|---|---|
| Remote Controller | 0x28~0x31 | 0x28: Lighting for student Others: TBD |

FIG. 9 illustrates an example of a data command to control a multi-zone of a lighting apparatus according to example embodiments and FIG. 10 illustrates an example of forming a multi-zone using the lighting apparatus according to example embodiments.

Referring to FIG. 9, a zone of a lighting device may be set based on the data format of FIG. 7, using the 'Light Device Setting' of the setting command of FIG. 4. In this example, a zone #1 is set for lighting devices #1 through #4, a zone #2 is set for lighting devices #5 through #8, a zone #3 is set for lighting devices #9 through #12, and a zone #4 is set for lighting devices #13 through #16, as illustrated in FIG. 10.

A button of a switch 110 may be set based on the data format of FIG. 8, using 'Switch Setting' of the setting command of FIG. 4.

Each switch 110 may control a corresponding lighting device, based on the 'Zone Control' of the setting command of FIG. 6. For example, when a button #1 of the switch 110 is pressed, 'Zone Control' is wirelessly transmitted to control each lighting device. In this example, data including 'Zone Control' may be broadcasted.

For example, when a button #8 of the switch 110 is pressed, the lighting device #1, the lighting device #2, the lighting device #3, and the lighting device #4 may be simultaneously controlled based on 'Zone Control'.

In this example, the lighting devices may be variously arranged, and a command from a starting device may be transmitted to a target device.

Figure 11:
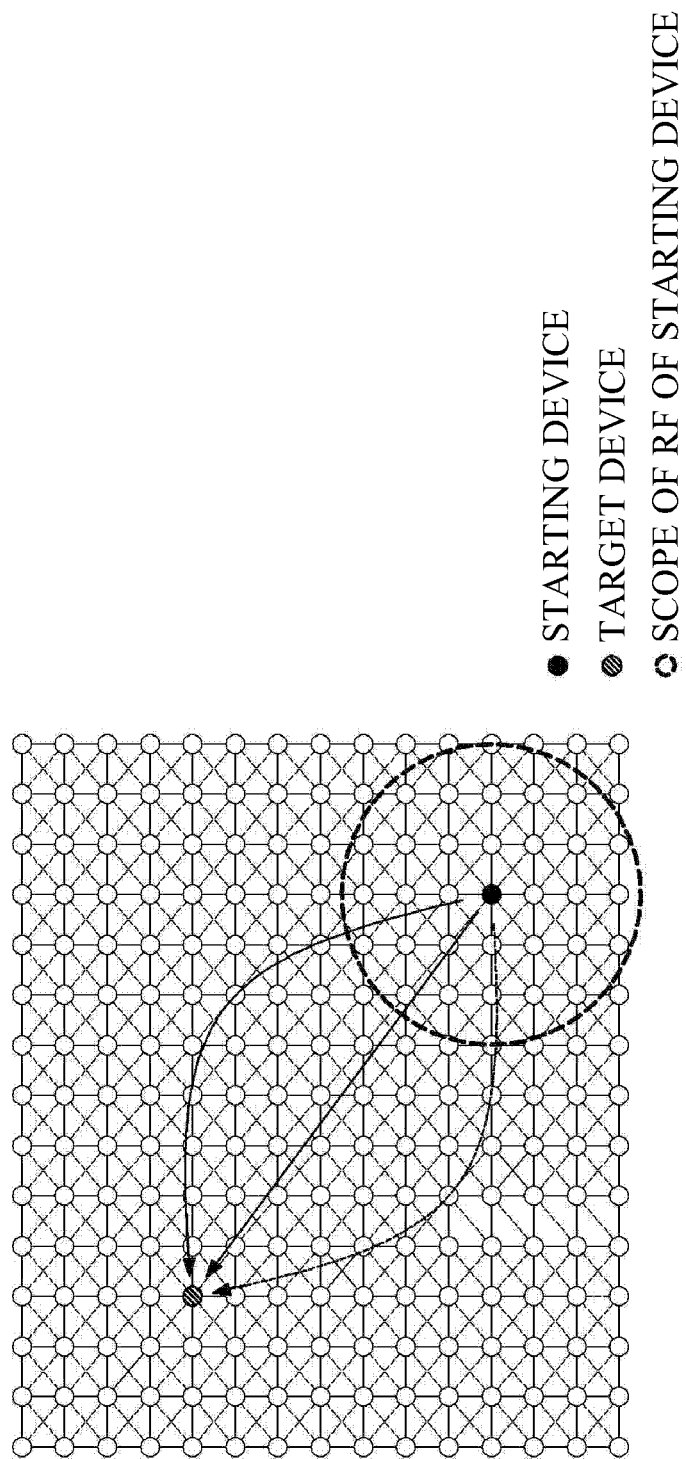
FIGS. 11 through 13 illustrate an operation of transmitting data from a starting device to a target device in a lighting apparatus according to example embodiments.
Figure 12:
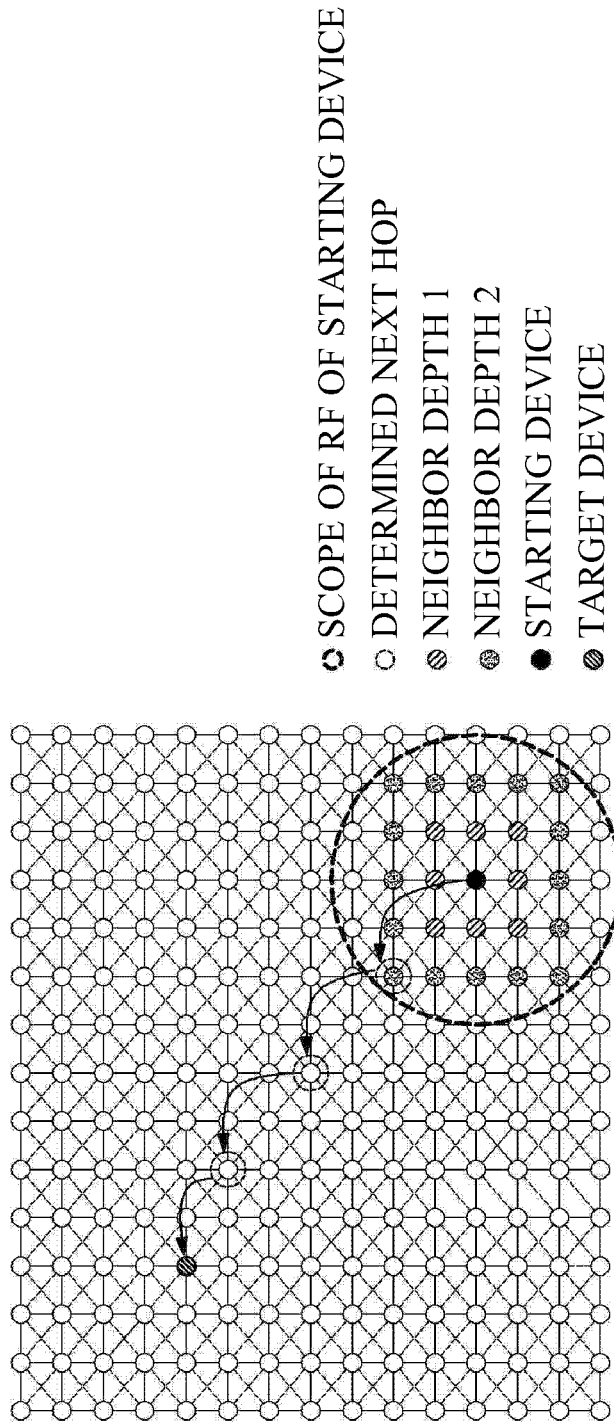
Figure 13:
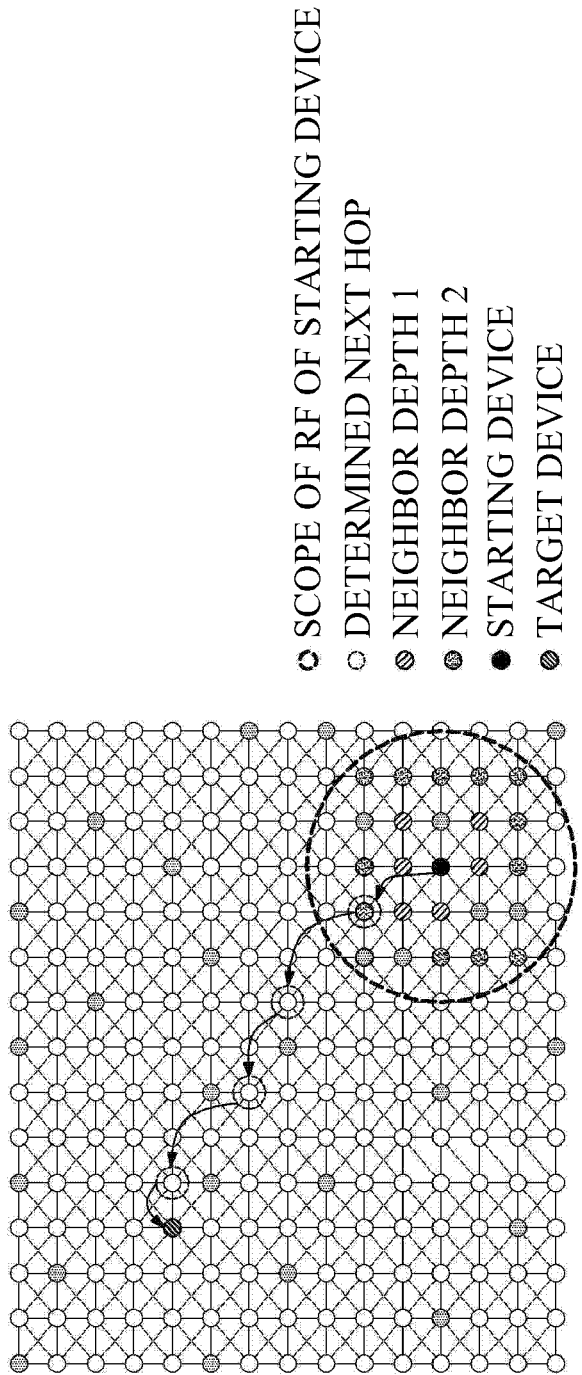

FIGS. 11 through 13 illustrate an operation of transmitting data from a starting device to a target device in a lighting apparatus according to example embodiments.

Referring to FIG. 11, each device may include a neighbor table, which preferentially stores, information associated with a radius of 1 hop and information associated with a radius of 2 hops, and may manage the information. Each device may determine, as a next hop, a device having a lowest cost, based on the neighbor table, when routing is performed. In this example, the cost may be calculated based primarily on a distance.

Referring to FIGS. 12 and 13, each device may detect a new route to avoid bypassing a device that currently does not operate, and may transmit data.

According to example embodiments, a multi-zone for a plurality of lighting devices connected to a wireless network may be formed and controlled and thus, a desired lighting device may be easily changed and controlled.

Although embodiments have been shown and described, it would be appreciated by those skilled in the art that changes may be made in these embodiments without departing from the principles and spirit of the disclosure, the scope of which is defined by the claims and their equivalents.

What is claimed is:
1. A lighting apparatus, comprising:
a plurality of devices including a plurality of lighting devices included in a network set in advance, the network including a switch comprising buttons configured to control the plurality of lighting devices;
a coordinator configured to manage the network; and
a remote controller configured to control a multi-zone that is included in the network and to group the plurality of lighting devices into a plurality of groups,
wherein the remote controller is configured to transmit a command which sets the buttons of the switch so that the buttons are configured to control functions of the grouped lighting devices,
wherein each of the lighting devices is configured to store information related to neighboring lighting devices, and transmit data from a starting lighting device to a target lighting device by using the stored information to determine a route, from the starting lighting device to the target lighting device, which has a lowest cost among a plurality of costs associated with a corresponding plurality of routes,
wherein the remote controller is configured to generate a control frame to be transmitted to a selected lighting device, the control frame comprising a data field indicating a length of information to be transmitted, the data field comprising a command to be transmitted to the lighting device, the command comprising a setting command, a transmission command, and a control command, and
the transmission command commands transmitting of a parameter set for forming and controlling a zone of the plurality of lighting devices and information associated with a state of the plurality of lighting devices and whether the plurality of lighting devices are broken, a parameter set for the switch and information associated with a state of the switch and whether the switch is broken, a parameter set for correcting an illuminance sensor and information associated with a state of the illuminance sensor and whether the illuminance sensor is broken, a parameter set for a motion of a motion sensor and information associated with a state of the motion sensor and whether the motion sensor is broken, and a parameter set for a control element of the remote controller and information associated with a state of the remote controller and whether the remote controller is broken, and further commands transmitting of a database of each device included in the network via the coordinator.

2. The lighting apparatus of claim 1,
wherein the control frame further comprises a start of text (STX) field indicating a state of the control frame, a data field including information to be transmitted, a checksum field to be used for determining an error, and an end of text (ETX) field indicating an end of the control frame.

3. The lighting apparatus of claim 1, wherein the data field comprises a primitive identification (ID) where an objective of transmission of information is written, a device address indicating an address of a lighting device that is a target for the transmission, and command data including data to be used for the command.

4. The lighting apparatus of claim 1, wherein:
the plurality of devices includes the illuminance sensor and the motion sensor; and
the setting command commands setting of at least one of a parameter for forming and controlling the zone of the plurality of lighting devices, a function of the switch, a parameter for correcting the illuminance sensor, the motion of the motion sensor, and the control element of the remote controller.

5. The lighting apparatus of claim 1, further comprising:
a scene controller configured to control a scene of the plurality of lighting devices, wherein the control command commands controlling at least one of the plurality of lighting devices for each of a plurality of zones in the multi-zone and for each of a plurality of channels, the plurality of lighting devices for each lighting device and for each channel, resetting of the plurality of lighting devices, and the scene of the plurality of lighting devices.

6. The lighting apparatus of claim 1, wherein the command sets the buttons so that each button is configured to control functions of lighting devices belonging to a different respective group.

7. The lighting apparatus of claim 1, wherein a route which has a shortest distance from the starting lighting device to the target lighting device, among the plurality of routes, is determined to be the route which has the lowest cost.

* * * * *